United States Patent [19]

Taylor

[11] 4,017,148
[45] Apr. 12, 1977

[54] TRI-POWER PERISCOPE HEAD ASSEMBLY
[75] Inventor: William H. Taylor, South Deerfield, Mass.
[73] Assignee: Kollmorgen Corporation, Hartford, Conn.
[22] Filed: July 16, 1975
[21] Appl. No.: 596,515
[52] U.S. Cl. .............................................. 350/37
[51] Int. Cl.² ........................................ G02B 7/04
[58] Field of Search ............................. 350/37–40, 350/43, 44, 48–54, 183, 212, 231, 175 FS

[56] References Cited
UNITED STATES PATENTS 1,236,722  8/1917  Lange ................................. 350/39
1,484,853  2/1924  Warmisham ....................... 350/231

FOREIGN PATENTS OR APPLICATIONS 1,547,540  11/1968  France ............................... 350/39

Primary Examiner—John K. Corbin
Assistant Examiner—Jon W. Henry
Attorney, Agent, or Firm—Morgan, Finnegan, Pine, Foley & Lee

[57] ABSTRACT

A tri-power periscope head assembly utilizing three modular optical assemblies comprised of a highly corrected Petzval type objective lens and first and second Galilean telescope assemblies, each of which is adapted to be simply and readily reversible. In one preferred embodiment, the Galilean telescope assemblies have respective powers of 1.4X and 2X. Manually operable reversing means are provided to alter overall visual system magnification at discrete values of 1.5X, 6X and 12X respectively.

4 Claims, 7 Drawing Figures

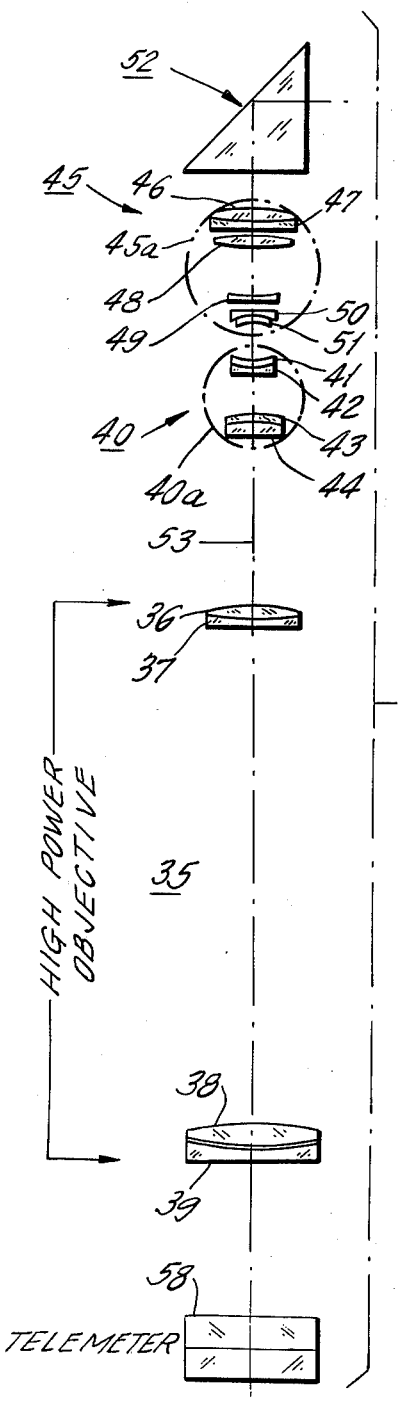
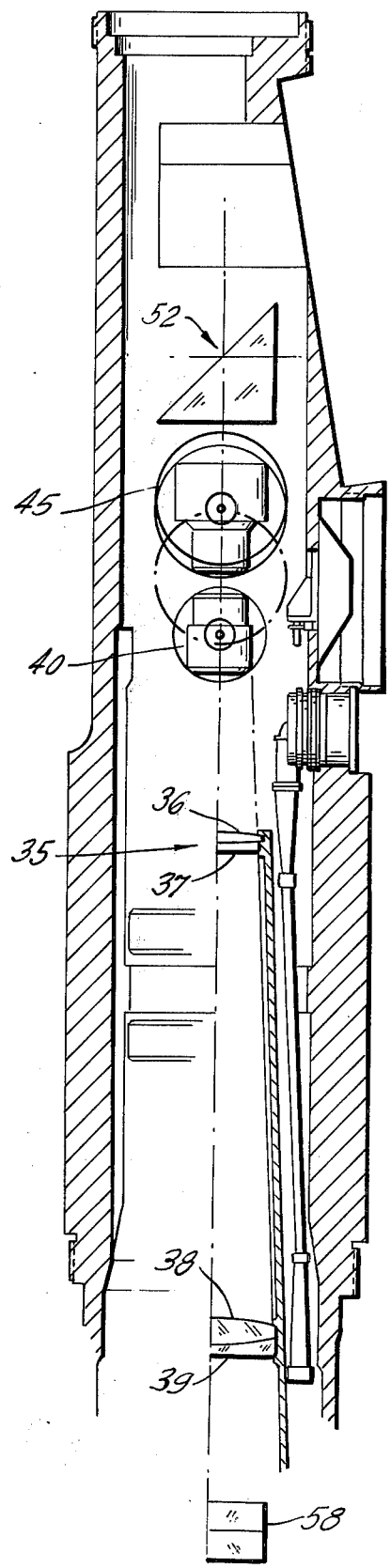

TRI-POWER PERISCOPE HEAD ASSEMBLY

BACKGROUND AND BRIEF DESCRIPTION OF THE INVENTION

The present invention relates to periscope systems and more particularly to a novel periscope head assembly employing a plurality of self-contained, independently designed, reversible lens assemblies for providing a periscope system having a plurality of different selectable powers of magnification.

Periscope systems are presently in use, especially in submarines, for binocular viewing, stadimetric ranging, television camera viewing, photographing and radar surveillance. Periscopes are typically categorized as search periscopes and attack periscopes, the former typically being utilized for the search, target acquisition and navigational phases of operation while the latter are typically intended for use during the attack phase of operation.

Periscopes presently in use typically provided a capability of visual magnification selection between 1.5 and 6X. Modification kits have recently been developed to increase the capability to include 12X magnification for use in periscopes of both the search and attack type. However, the drive systems for selecting this particular power of magnification presently utilize torque motor driven cubes for shifting the power change lens assemblies creating the necessity for complicated electrical power means to effect shifts in the desired magnification.

In accordance with the present invention there is provided a head assembly for periscopes and the like, utilizing first and second Galilean telescope assemblies in conjunction with a lens assembly of the Petzval type, wherein both of the telescope assemblies are selectively and independently reversible to move to either of two operating positions through a 180° rotation to permit simple and yet rapid selection of the desired magnification power. Having all of the optical elements functioning within the system under all magnifications leads to a system having a consistency of image quality previously unattainable.

Each of the lens assemblies is separately designed and bench adjusted to substantially eliminate the need for field adjustments and with a view toward significant size reduction so as to reduce the moment of inertia of the lens assemblies by a factor of 30 to 40 compared to conventional assemblies, thereby enabling magnification shifts to occur in 1/30th to 1/40th of the time required for conventional systems.

The mechanical drive system utilizes Geneva drive mechanisms which exert no deleterious influence on lens assembly locations, and hence upon optical collimation, and provide for sinusoidal motion of the reversible lens assemblies to prevent abrupt slamming of the lens assemblies into their location stops regardless of how quickly the assemblies are reversed.

BRIEF DESCRIPTION OF THE DRAWINGS

The invention is set forth in greater detail in the specification of which the following drawings form a part.

FIG. 1 shows a simplified view of the optical lens assemblies employed in the tri-power periscope head of the present invention;

FIG. 3 shows a simplified elevational view of the periscope head of the present invention, designating the locations of the reversible lens assemblies;

DETAILED DESCRIPTION OF THE INVENTION

Figure 2:
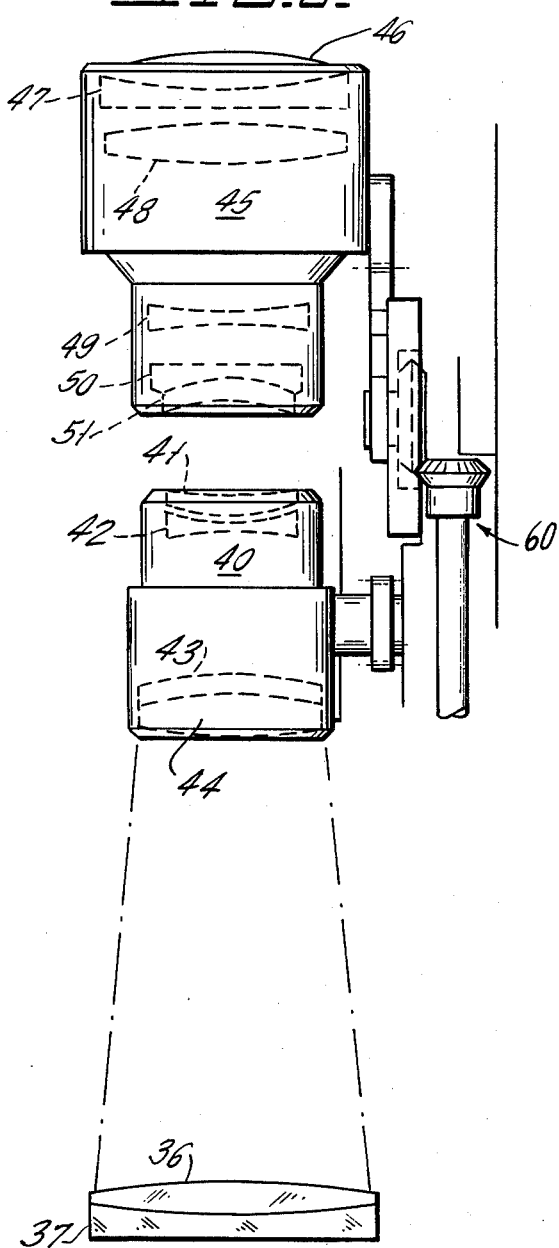
FIG. 2 shows an elevational view of the reversible lens assemblies of FIG. 1 and the reversible drive therefor.

The present invention may be utilized in periscope systems of both the attack and search type. The lens assemblies employed in the periscope head assembly are shown best in FIG. 1, while FIG. 3 shows the aforesaid lens assemblies and their location within the head assembly.

The novel tri-power optical system consists of three modular type optical assemblies including a highly corrected Petzval type objective lens 35 comprised of lens elements 36-39; a 1.4X reversible Galilean telescope assembly 40 comprised of elements 41-44; and a 2.0X reversible Galilean telescope 45 comprised of lens elements 46-51. The upper end of the optical system is provided with a prism 52 for reflecting incoming light rays along the horizontal line of sight (HLOS) to the substantially vertically aligned optical axis 53.

Dotted circles 40a and 45a represent the outer limits of the Galilean telescopes 40 and 45, respectively, when subjected to rotation for selecting one of the magnification powers of the optical system. Each Galilean telescope is designed individually and both are reversible in nature.

Petzval objective lens assembly 35 provides an increased length to Effective Focal Lens (EFL) ratio permitting the entire package to be installed in existing periscopes with no changes required below the telemeter housing, whose location is shown at 58 in FIG. 1, so as to avoid disturbance or alteration of any of the focus and alignment of the relays therein. The Petzval design further eliminates the need for a collector lens in the vicinity of the telemeter surface which reduces the problem of dust and dirt at the telemeter surface and can permit usage of cross wires for the reticle in lieu of an etched glass surface.

The modular construction permits the objective lens assembly 35 and the telemeter 58 to be preassembled and bench adjusted to avoid the necessity for complex field adjustment and testing. These same advantageous features also pertains to each of the Galilean assemblies. Although the objective assembly 35 by itself is well corrected, the system design concept is such that it is never used alone in that the two reversible Galilean assemblies are always in place between the objective and the periscope head prism 52. This permits good correction of the field curvature aberration for all three powers.

For the nominal position (shown in FIG. 1) which produces 6X visual magnification, or a 429mm. EFL, the 2X Galilean 45 is used in the magnification mode while the 1.4X Galilean 40 is employed in the reduction mode. Reversal of the 2X Galilean 45 causes a magnification reduction of ¼X altering the 6X visual mode to 1½X and the 429mm. EFL becomes 107mm. Should a change from the nominal mode (6X, 429 EFL) to higher amplification be desired, the 1.4X Galilean 40 is reversed, increasing the magnification by a factor of 2X, resulting in a 12X visual system or an 858mm. EFL especially advantageous for use in the picture taking mode.

The three configurations described hereinabove have been carefully designed so that each produces a well corrected 60mm. diameter image at the telemeter 58. In the nominal 6X mode, this image represents an 8° field of view. In the 1½X mode, the field is 32° while in the 12X mode, it is 4°. Maximum vignetting is limited to 60% which is substantially equal to that found in present day systems. For all magnifications, the exit pupil location of the Galilean-objective combination is held constant and is made compatible with the entrance pupil of the relay lenses that follow. Since the optics between the telemeter 58 and the eye remain constant for all magnifications, the angular subtense of the reticle lines to the eye also remain constant.

FIG. 2 shows the reversible drive 60 for driving the reversible lens assemblies. FIG. 3 shows further details of the periscope head assembly.

Figure 4A:
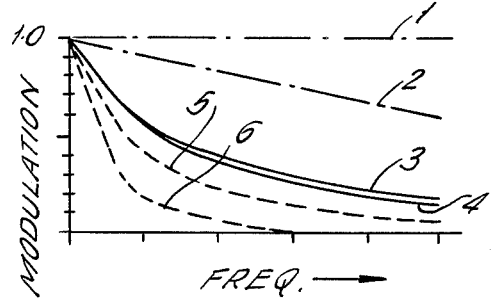
FIGS. 4A, 4B and 4C show graphically the image quality of the optical system.
Figure 4B:
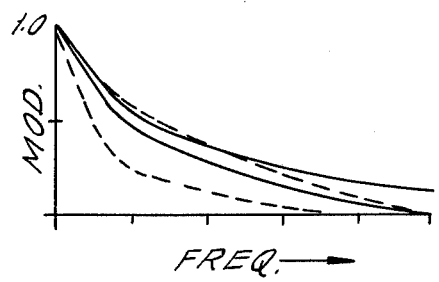
Figure 4C:
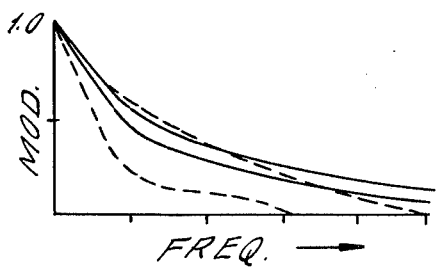

Optical performance of the new tri-power system has been evaluated by comparison of computer data with similar data for present day periscopes which provide acceptable operation. One of the most important evaluations available is the modulation transfer function (MTF) calculation in the photographic mode. FIGS. 4A, 4B and 4C graphically present the resulting MTF data, which is a representation of system image quality. The data which are transferred by the optical system from the object to the image may legitimately be assumed to be made up of sine wave patterns of varying amplitude and frequency. As the amplitude of the signal is reduced by the optics, the contrast of the image falls off, making resolution of the pattern less likely or impossible.

Figure 5:
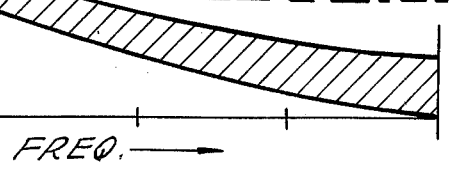
FIG. 5 shows graphically the unusual consistency of system image quality for all magnifications and field points.

Referring specifically to FIG. 4A, curve 1 shows the ideal transfer function for any optical system. Since the amplitude modulation factor is 1.0 for all frequencies the image will be an exact reproduction of the object. Diffraction effects at the aperture of a system such as that being considered dictate that the best possible function would be as shown in curve 2. Residual aberrations tend to further degrade image quality to the point where the final performance is predicted by the curves 3 and 4 for the on-axis and off-axis cases respectively. This level of image quality may be compared with similar curves 5 and 6 for systems of conventional design. These curves consider the case of lowest magnification. Similar curves for medium and high magnifications are shown in FIGS. 4B and 4C. Throughout FIGS. 4A, 4B and 4C the curves are similar regardless of magnification or field position. FIG. 5 serves to further illustrate this point. The shaded area in FIG. 5 includes all of the curves of FIGS. 4A, 4B and 4C which pertain to the subject optical system.

Further calculations show that the transmission characteristics of the compared systems are substantially equivalent. Summarizing the optical performances of the compared systems, it has been found that with the optical system of the subject invention the photographic image quality is improved and significantly more consistent for all magnifications, overall light transmission is unchanged, visual performance is equal to or better than the conventional system, the modular concept employed in the Galilean and objective assemblies greatly simplifies alignment and collimation and, from the optical performance point of view, the tri-power design of the present invention is free of disadvantages when compared with the periscope systems presently in use.

The double Galilean assemblies in the periscope head mount afford optics that are dimensionally less than ½ the size and ⅛ the weight of present designs and reduce the moment of inertia of the lens gears by approximately 30 to 40 times. Thus, if the same effort were applied to rotate the new cubes as has been applied to the present large cubes, the magnification shift would occur in 1/30th to 1/40th the time. Since both magnification changes are mechanical and since both cubes are approximately equal in mass, the change from 6X to 12X magnification occurs just as quickly and with equivalent effort and motion as is presently common to the 1.5 to 6X changes of present day periscopes.

The optical-mechanical formula is such that sequentially changing magnification from 1.5 to 6 to 12X or 12 to 6 to 1.5X never involves the rotation of more than one Galilean assembly. Thus, all of the magnification changes from one to the other involve about the same time interval, effort and motion to accomplish. In addition, the mechanical system totally eliminates the electrical requirements of conventional designs, including the need for a special electrical control box previously mounted in the eyepiece box.

The new tri-power optical configuration eliminates many of the mechanical problems which have plagued conventional designs, including but not limited to replacement of drive tapes by a shaft which only provides the motor force to change magnification and is not utilized in any way for position control. The operating shaft is arranged so that no axial loads, due to temperature caused dimensional changes, are mechanically fed back or in any way influence the positions of the optical assemblies 40 and 45. The magnification positions of the assemblies are established by hard stops in the head which are adjusted at the time of assembly and which are maintained by the holding forces of overcenter toggle springs. Shifts from one magnification power to the next can be accomplished as quickly as the operator can twist the training handle.

In conventional designs for visual magnification of 12X, a 2X Galilean is introduced into the space above the focusing erector at full aperture. These lenses must swing out of the optical path in order to return to 6X magnification. Therefore, very little room exists to pass waveguide, coaxial runs, and conductors through the resulting bottleneck. In the new system, this bottleneck does not exist since the 12X magnification optics are all in the periscope head assembly.

In addition to cost reduction, quicker actuation of the 12X magnification selection, easier field installation and increased reliability, the additional benefit of the employment of Galilean optics enables the design of a high power objective lens in the Petzval configuration which eliminates the need for a collector lens at the telemeter. The telemeter/collector lens has been found to be the primary contributor to the retro-reflection problem currently experienced in conventional designs, which undesirable condition is significantly reduced as a result of the tri-power system of the present invention which is capable of accepting either a sandwich-type telemeter or a wire reticle.

Whereas the present invention has been described for providing specific magnification powers and simple and rapid selection therebetween, it should be understood that other magnification powers may be provided without departing from the spirit of the present invention.

Although the present invention has been described in connection with preferred embodiments thereof, many variations and modifications will now become apparent to those skilled in the art. The present invention is limited not by the specific disclosure herein but only by the appended claims.

What I claim is:

1. An optical system for a periscope head assembly, said optical system having an optical axis and comprising:
   a. a first telescopic lens assembly aligned with said optical axis for altering the magnification of said optical system, said first lens assembly having two positions, both of which transmit light, the alteration of the magnification of said optical system by said first lens assembly being effected by rotating said first lens assembly approximately 180° in a plane substantially parallel to said optical axis;
   b. a second telescopic lens assembly aligned with said optical axis for altering the magnification of said optical system, said second lens assembly having two positions, both of which transmit light, said second lens assembly being in series with said first lens assembly, said first and second lens assemblies forming a part of the optical path regardless of the magnification selected, the alteration of the magnification of said optical system by said second lens assembly being effected by rotating said second lens assembly by approximately 180° in a plane substantially parallel to said optical axis, said first and second lens assemblies providing, in combination, three different optical magnifications; and
   c. an objective lens assembly aligned with said optical axis for receiving optical information transmitted serially by said first and second lens assemblies.

2. An optical system according to claim 1 wherein said first and second lens assemblies are Galilean-type telescopic lenses and said objective lens assembly comprises a Petzval-type lens.

3. An optical system according to claim 1 wherein said three different optical magnifications are 1.5X, 6X and 12X and wherein the magnification can be changed successively from 1.5X to 6X, from 6X to 12X, from 12X to 6X and from 6X to 1.5X by rotating only one of said two lens assemblies to effect each change in magnification.

4. An optical system according to claim 3 wherein said first and second lens assemblies are Galilean-type telescopic lenses and said objective lens assembly comprises a Petzval-type lens.

* * * * *